(12) United States Patent
Yokoo

(10) Patent No.: US 8,186,061 B2
(45) Date of Patent: May 29, 2012

(54) MANUFACTURING METHOD OF BEARING, BEARING UNIT, ROTARY APPARATUS, AND MANUFACTURING METHOD OF SLIDING MEMBER

(75) Inventor: Yoshinari Yokoo, Komagane (JP)

(73) Assignee: Gast Japan Co., Ltd., Nagano (JP)

( * ) Notice: Subject to any disclaimer, the term of this patent is extended or adjusted under 35 U.S.C. 154(b) by 1160 days.

(21) Appl. No.: 11/935,192

(22) Filed: Nov. 5, 2007

(65) Prior Publication Data

US 2011/0123141 A1    May 26, 2011

(30) Foreign Application Priority Data

Nov. 6, 2006   (JP) ................................. 2006-301016

(51) Int. Cl.
*B21D 33/00* (2006.01)
*B21D 53/10* (2006.01)
*F16C 33/00* (2006.01)

(52) U.S. Cl. .................. 29/898; 29/898.054; 29/898.12; 384/91; 384/416

(58) Field of Classification Search .................... 29/898, 29/898.02, 898.054, 898.012, 898.14, 898.12; 205/106; 210/90; 284/91, 107, 114, 416; 384/91, 107, 114, 416
See application file for complete search history.

(56) References Cited

U.S. PATENT DOCUMENTS

| | | | | |
|---|---|---|---|---|
| 5,339,523 A * | 8/1994 | Hasegawa | ................... | 29/898.02 |
| 6,409,389 B1 * | 6/2002 | Kadokura et al. | ............ | 384/100 |
| 7,005,768 B2 | 2/2006 | Tamaoka et al. | | |
| 7,134,791 B2 | 11/2006 | Tokoo | | |
| 2004/0252923 A1 | 12/2004 | Mizusaki et al. | | |
| 2007/0047857 A1 * | 3/2007 | Hamada et al. | ................ | 384/100 |
| 2007/0092171 A1 * | 4/2007 | Asada et al. | ................... | 384/107 |
| 2011/0044837 A1 * | 2/2011 | Hamada et al. | ................. | 419/27 |

FOREIGN PATENT DOCUMENTS

| | | |
|---|---|---|
| JP | 47-32163 | 8/1972 |
| JP | 59-185798 A | 10/1984 |
| JP | 61-1514 B2 | 1/1986 |
| JP | 61-053444 | 3/1986 |
| JP | 63-272469 | 11/1988 |
| JP | 2-203015 A | 8/1990 |
| JP | 2825334 B2 | 9/1998 |
| JP | 2004-176816 A | 6/2004 |
| JP | 2005-48285 A | 2/2005 |
| JP | 2005-272934 A | 10/2005 |
| JP | 2006-077802 | 3/2006 |
| JP | 2006-292024 A | 10/2006 |
| WO | 2004/036074 A1 | 4/2004 |

* cited by examiner

*Primary Examiner* — Alexander P Taousakis
(74) *Attorney, Agent, or Firm* — Lowe Hauptman Ham & Berner LLP

(57) ABSTRACT

A manufacturing method of a bearing according to the present invention includes a bearing forming member preparing step S10 for preparing a bearing forming member W made of AlSi alloy containing 5 weight % to 40 weight % of Si, a pressure sizing step S20 which decreases a maximum crest height Rp of a bearing surface 132 by performing pressure sizing of the bearing surface 132 of the bearing forming member W, and an aluminum oxide film forming step S30 for forming an aluminum oxide film 36 on the bearing surface 132 of the bearing forming member W by anodizing the bearing surface 132 of the bearing forming member W in this order. According to the manufacturing method of a bearing of the present invention, it is possible to manufacture a bearing which can maintain the bearing performance over a long period.

7 Claims, 9 Drawing Sheets

FIG.7A1 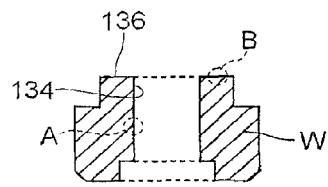
FIG.7A2 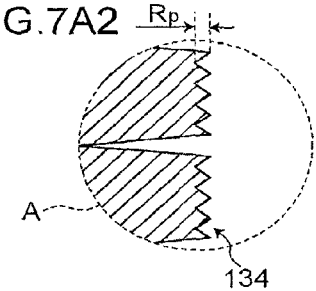
FIG.7A3 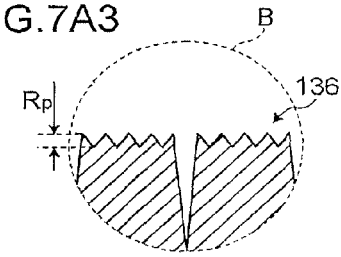
FIG.7B1 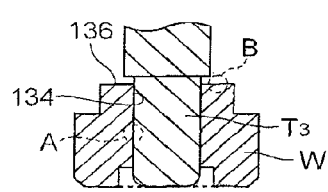
FIG.7B2 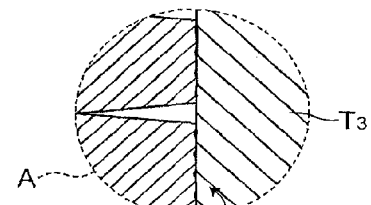
FIG.7B3 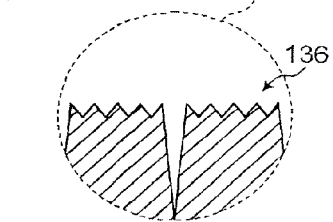
FIG.7C1 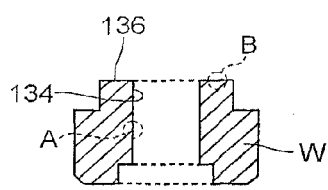
FIG.7C2 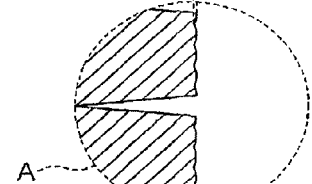
FIG.7C3 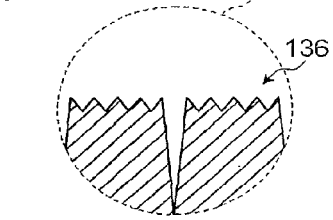
FIG.7D1 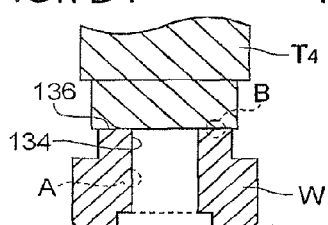
FIG.7D2 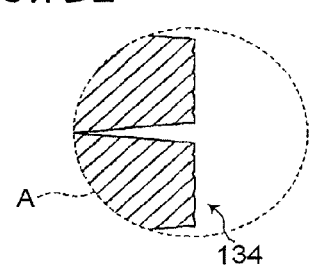
FIG.7D3 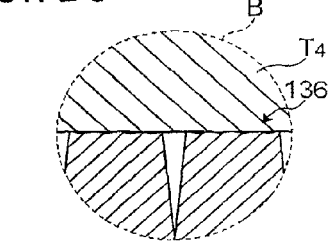
FIG.7E1 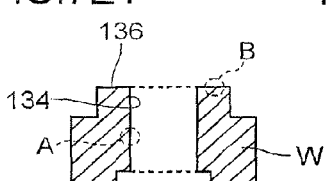
FIG.7E2 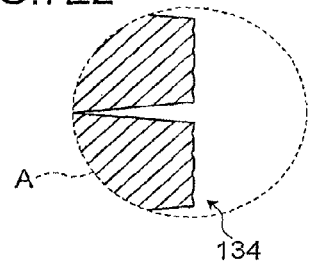
FIG.7E3 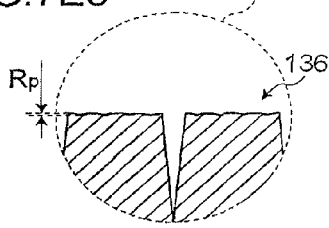

FIG.8A1
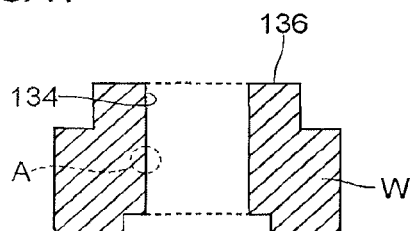
FIG.8A2
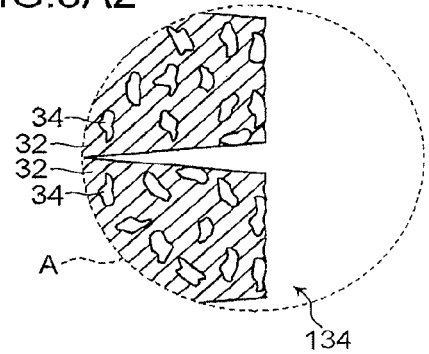
FIG.8B1
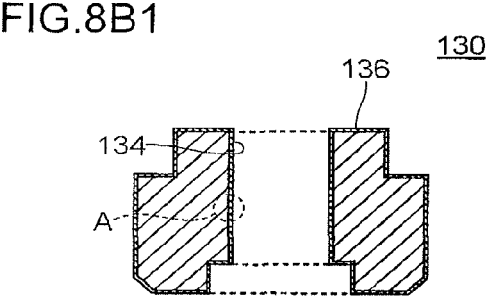
FIG.8B2
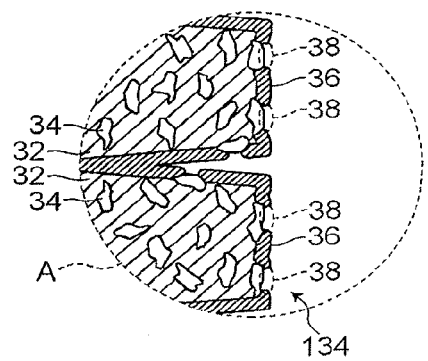
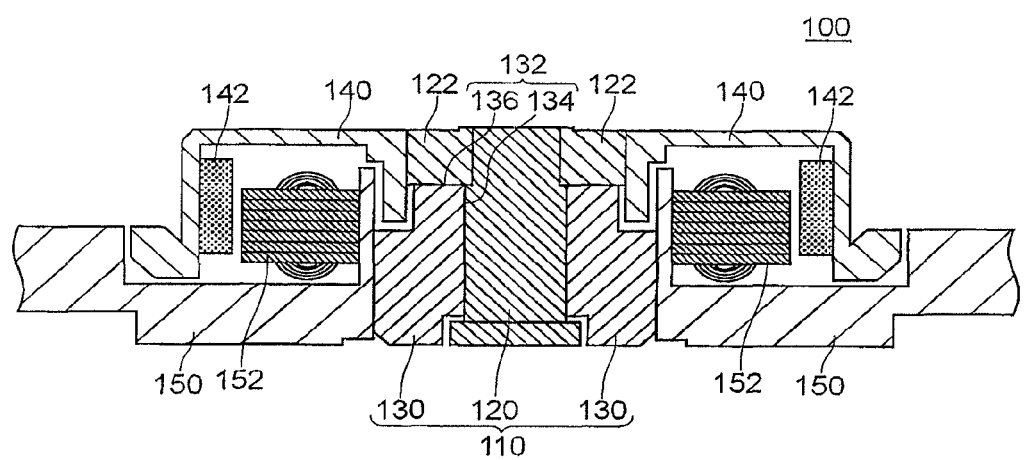
FIG.9

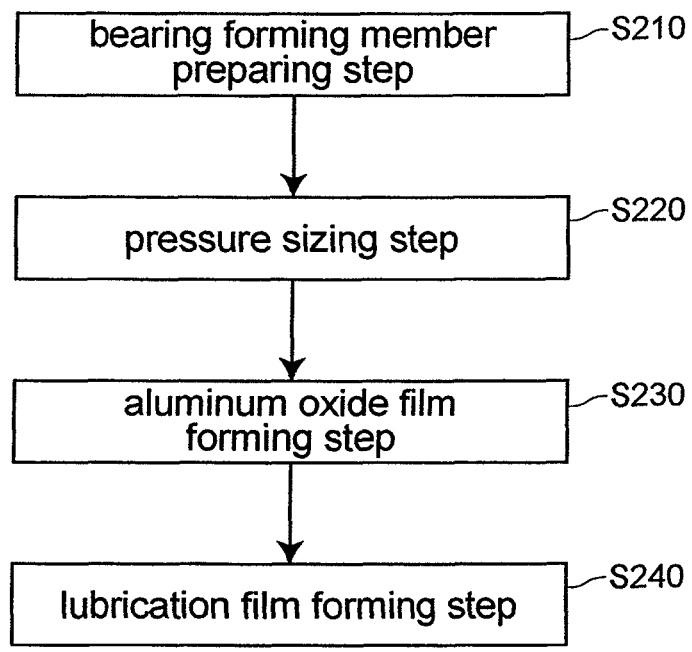
FIG.10
FIG.11A1
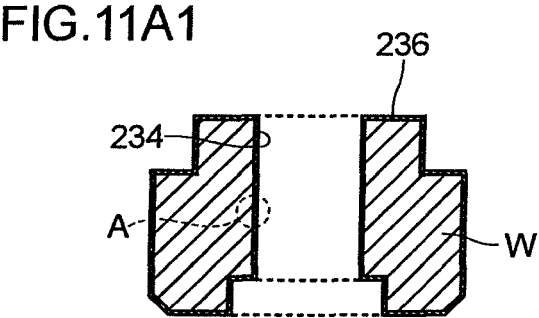
FIG.11A2
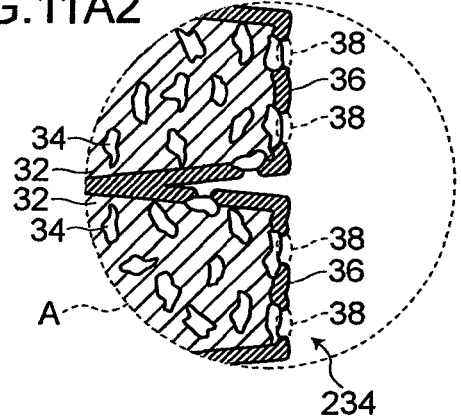
FIG.11B1
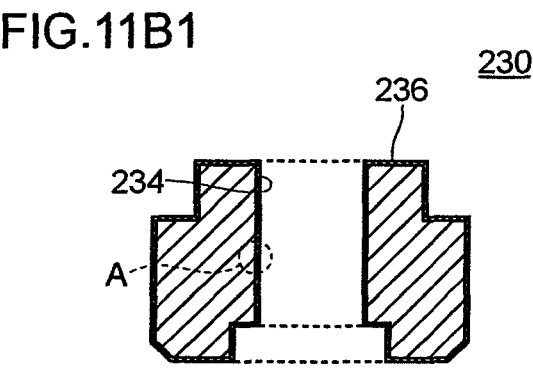
FIG.11B2
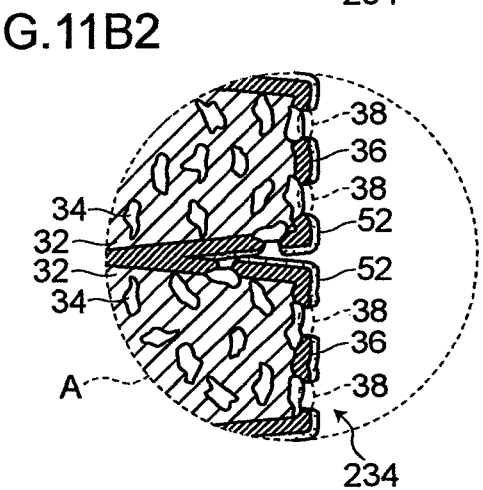

MANUFACTURING METHOD OF BEARING, BEARING UNIT, ROTARY APPARATUS, AND MANUFACTURING METHOD OF SLIDING MEMBER

TECHNICAL FIELD

The present invention relates to a manufacturing method of a bearing, a bearing unit, a rotary apparatus and a manufacturing method of a sliding member.

BACKGROUND ART

Conventionally, there has been known a bearing unit including a bearing and a shaft rotatably supported on a bearing surface of the bearing (see patent document 1, for example).

FIG. 14 is a view for explaining a conventional bearing unit 910. The conventional bearing unit 910 includes, as shown in FIG. 14, a bearing 930 having a bearing surface 932, a bearing 960 having a bearing surface 962, and a shaft 920 rotatably supported on the bearing surface 932 of the bearing 930 and the bearing surface 962 of the bearing 960.

The bearing 930 includes, as the bearing surface 932, a radial bearing surface 934 and a thrust bearing surface 936. The shaft 920 has a thrust plate 922 disposed at a position sandwiched between the thrust bearing surface 936 of the bearing 930 and the bearing surface 962 of the bearing 960, and is rotatably supported on the radial bearing surface 934 and the thrust bearing surface 936 of the bearing 930 and the thrust bearing surface 962 of the bearing 960. A lubricant (not shown in the drawing) is filled in a gap defined between the bearing surface 932 of the bearing 930 and the shaft 920 and in a gap defined between the bearing surface 962 of the bearing 960 and the shaft 920.

According to the conventional bearing unit 910 having such a constitution, due the presence of the lubricant in the gap defined between the bearing surface 932 of the bearing 930 and the shaft 920 and in the gap defined between the bearing surface 962 of the bearing 960 and the shaft 920, the bearing performance of the bearing unit can be enhanced.
[Patent document 1] JP-A-2004-176816

DISCLOSURE OF THE INVENTION

Task to be Solved by the Invention

There may be a case that the bearing unit is used also in a harsh environment such as an environment where the bearing unit is subject to high-speed rotation or high-load rotation. In such a harsh environment, the lubricant is liable to be easily dissipated from the gap defined between the bearing surface 932 of the bearing 930 and the shaft 920 and from the gap defined between the bearing surface 962 of the bearing 960 and the shaft 920 and hence, the bearing performance of the bearing unit is liable to be easily lowered whereby it is difficult for the bearing unit to maintain the predetermined bearing performance over a long period. Accordingly, there has been a demand for a bearing which can maintain the bearing performance over a long period even under such a harsh environment.

Here, such a demand generally exists not only with respect to the bearing but also with respect to a sliding member in general in a broad meaning which generates the rotational movement, the reciprocating movement and other slide movement between the slide member and a member to be in slidable contact with the sliding member. That is, also with respect to these sliding members in general, the lubricant is liable to be easily dissipated from the gap defined between the sliding member and the member to be in slidable contact with the sliding member in the harsh environment and hence, the sliding performance of the sliding member is liable to be easily lowered whereby it is difficult for the sliding member to maintain the predetermined sliding performance over a long period. Accordingly, also even under such a harsh environment, there has been a demand for a sliding member which can maintain the sliding performance over a long period.

The present invention has been made under such circumstances, and it is an object of the present invention to provide a manufacturing method of a bearing capable of maintaining the bearing performance over a long period. Further, it is also an object of the present invention to provide a bearing unit which includes a bearing manufactured by such a bearing manufacturing method. Still further, it is another object of the present invention to provide a rotary apparatus including such an excellent bearing unit. It is a still further object of the present invention to provide a manufacturing method of a sliding member capable of maintaining a slide performance over a long period.

Means for Solving the Task

The inventor of the present invention have made extensive studies to achieve the above-mentioned objects, and have completed the present invention based on a finding that the bearing performance can be maintained over a long period by realizing the structure which makes the dissipation of a lubricant from a gap defined between a bearing surface of a bearing and a shaft and a gap defined between a sliding surface of a sliding member and a member to be in slidable contact with the sliding member difficult.

(1) A manufacturing method of a bearing according to the present invention is characterized by including a bearing forming member preparing step for preparing a bearing forming member made of AlSi alloy containing 5 weight % to 40 weight % of Si, and an aluminum oxide film forming step for forming an aluminum oxide film on a bearing surface of the bearing forming member by anodizing the bearing surface of the bearing forming member in this order.

The AlSi alloy possesses the microstructure where a Si phase having a size of several μm to several tens μm is distributed in an Al phase in an island pattern. Accordingly, in the manufacturing method of a bearing according to the present invention, when anodizing is applied to the AlSi alloy, the portions of the AlSi alloy where the Al phase is exposed are formed in a raised state due to the formation of the aluminum oxide film, and the aluminum oxide film is not formed on the portions of the AlSi alloy where the Si phase is exposed thus forming a large number of indentations (hereinafter, refereed to as dimples) thereon. That is, on the bearing surface of the bearing, the aluminum oxide film having a large number of dimples is formed. Here, the size of the dimples is approximately equal to the size of the Si phases (several μmm to several tens μm) and hence, the lubricant is hardly dissipated from a gap defined between the bearing surface of the bearing and the shaft due to a capillary phenomenon. As a result, according to the manufacturing method of a bearing of the present invention, it is possible to manufacture a bearing which can maintain the bearing performance over a long period.

Further, when the bearing and the shaft are respectively made of metals, a phenomenon referred to as "galvanic corrosion" occurs due to a potential difference between the bearing and the shaft and hence, the bearing and the shaft are liable to be easily corroded. To the contrary, according to the manufacturing method of a bearing of the present invention, due to the presence of the aluminum oxide film having the high insulation property on the bearing surface of the bearing, the corrosion of the bearing and the shaft can be suppressed and hence, it is also possible to manufacture a bearing which can maintain the bearing performance over a long period.

Further, according to the manufacturing method of a bearing of the present invention, due to the presence of the aluminum oxide film having high hardness on the bearing surface of the bearing, the wear resistance of the bearing surface of the bearing can be increased and hence, it is also possible to manufacture a bearing which can maintain the bearing performance over a long period.

Still further, according to the manufacturing method of a bearing of the present invention, the aluminum oxide film is formed in a finely dispersed manner on the bearing surface and hence, cracks hardly occur in the aluminum oxide film even under the high-load rotation whereby it is also possible to manufacture a bearing which can maintain the bearing performance over a long period.

Here, in the present invention, the "bearing" includes a radial bearing which receives an outer peripheral surface of the shaft, a thrust bearing which receives an end surface of the shaft, and a radial/thrust bearing which receives the outer peripheral surface and the end surface of the shaft and the like.

Further, in the present invention, "AlSi alloy" includes not only the AlSi alloy containing only Al and Si but also AlSi alloy containing an element (for example, Cu, Fe, Mg or the like) besides Al and Si.

In the manufacturing method of a bearing according to the present invention, the bearing forming member preparing step may preferably include an AlSi alloy fine powder manufacturing step for manufacturing AlSi alloy fine powder using an atomizing method and a bearing-forming-member manufacturing step for manufacturing the bearing forming member using the AlSi alloy fine powder in this order.

Since the atomizing method is a method for manufacturing metal fine powder by spraying molten metal, with the use of such a method, it is possible to manufacture the bearing forming member that possesses the microstructure where the fine Si phases are uniformly dispersed in the Al phase.

(2) In the manufacturing method of a bearing according to the present invention, a thickness of the aluminum oxide film is preferably set to a value falling within a range from 0.3 μm to 10 μm.

The reason that the thickness of the aluminum oxide film is set to the value falling within such a range is that when the thickness of the aluminum oxide film becomes less than 0.3 μm, the insulation property of the aluminum oxide film is lowered and hence, it becomes difficult to suppress the corrosion of the bearing and the shaft. Further, when the thickness of the aluminum oxide film exceeds 10 μm, the surface roughness of the bearing surface is increased and hence, the bearing performance of the bearing is lowered.

From such a viewpoint, it is more preferable to set the thickness of the aluminum oxide film to a value falling within a range from 0.5 μm to 3 μm.

(3) In the manufacturing method of a bearing according to the present invention, the manufacturing method may preferably further include a sizing step for decreasing a maximum crest height Rp of the bearing surface by performing sizing of the bearing surface between the bearing forming member preparing step and the aluminum oxide film forming step.

Due to such a method, a crest height of projecting portions present on the bearing surface can be decreased and hence, the occurrence of damages on the surface of the shaft can be suppressed whereby it is possible to manufacture a bearing which can maintain the bearing performance for a longer period.

In the manufacturing method of the bearing according to the present invention, although either one of pressure sizing and chemical sizing can be used as sizing, the pressure sizing is preferable.

Here, in the present invention, the "pressure sizing" implies an operation to decrease the maximum crest height Rp of the bearing surface by plastically deforming the projecting portions formed on the surface of the bearing surface by pressing the bearing surface of the bearing. By performing the "pressure sizing", it is also possible to shape the bearing surface of the bearing (for example, the increase of circularity).

Further, in the present invention, "chemical sizing" implies an operation to decrease the maximum crest height Rp of the bearing surface by selectively etching the projecting portions formed on the surface of the bearing surface due to chemical polishing of the bearing surface of the bearing.

In the present invention, when the pressure sizing is performed, since the AlSi alloy exhibits a small spring back rate (a rate at which the AlSi alloy restores an original shape after receiving a force for plastic deformation), the restoration of the maximum crest height Rp of the bearing surface to the original value after the pressure sizing can be relatively easily prevented.

(4) In the manufacturing method of a bearing according to the present invention, the manufacturing method may preferably further include a lubrication film forming step for forming a lubrication film made of a fluoro-resin on a surface of the aluminum oxide film after performing the aluminum oxide film forming step.

Due to such a manufacturing method, the lubrication film made of a fluoro-resin having the excellent lubrication property is present on an outermost surface of the bearing surface and hence, the lubrication property between the bearing surface of the bearing and the shaft can be increased thus further enhancing the bearing performance of the bearing.

(5) In the manufacturing method of a bearing according to the present invention, a dynamic pressure groove may preferably be formed in the bearing surface of the bearing forming member.

Due to such a manufacturing method, a dynamic pressure can be generated between the bearing and the shaft for bringing the bearing and the shaft into a non-contact state and hence, the bearing performance of the bearing can be further enhanced.

Even such a dynamic pressure groove is formed in the bearing forming member, when strong vibrations are applied to the bearing and the shaft, there may be a case where the bearing and the shaft are brought into contact with each other. Accordingly, the advantageous effect of the present invention that the bearing performance can be maintained over a long period is important also in this case in the same manner as the case where the dynamic pressure groove is not formed in the bearing forming member.

(6) A bearing unit according to the present invention is characterized by including a bearing manufactured by the manufacturing method of a bearing of the present invention, and a shaft rotatably supported on the bearing surface of the bearing.

Due to such a constitution, according to the bearing unit of the present invention, as described above, the bearing unit includes the bearing which can maintain the bearing performance over a long period and hence, it is possible to provide a bearing unit which can maintain the bearing performance over a long period.

In the present invention, "rotation" includes a case where the shaft performs the circular rotation in one direction and a case where the shaft performs the circular movement in the normal and reverse directions.

In the present invention, there are three cases of "rotation". In the first case, the shaft is rotated with respect to the fixed bearing. In the second case, the bearing is rotated with respect to the fixed shaft. In the third case, both the shaft and the bearing are rotated together.

(7) The bearing unit according to the present invention may preferably be configured such that the bearing includes a radial bearing surface and a thrust bearing surface as the bearing surface, the shaft includes a thrust plate which is positioned to face the thrust bearing surface in an opposed manner, and the shaft is rotatably supported on the radial bearing surface and the thrust bearing surface.

Due to such a constitution, it is possible to provide the bearing unit where the shaft is rotatably supported on the radial bearing surface and the thrust bearing surface.

(8) The bearing unit according to the present invention may preferably be configured such that the bearing unit further includes a pair of spherical slide bodies through which the shaft passes and is pressurized in the directions along which the spherical slide bodies approach each other, the bearing includes bearing surfaces formed in a shape corresponding to the spherical slide bodies as the bearing surface, and the shaft is rotatably supported on the bearing surface by way of the spherical slide bodies.

Due to such a constitution, since the bearing and the shaft are held by the spherical slide bodies pressurized in the directions along which the spherical slide bodies approach each other, it is possible to provide the bearing unit where the shaft is rotatably supported on the bearing surface with a small backlash.

(9) A rotary apparatus according to the present invention is characterized by including the bearing unit of the present invention.

Due to such a constitution, according to the rotary apparatus according to the present invention, as described above, the rotary apparatus includes the bearing unit capable of maintaining the bearing performance over a long period and hence, it is possible to provide the rotary apparatus which can maintain the high reliability over a long period.

As the rotary apparatus, a spindle motor, a pivot bearing of a hard disc, a rotational force transmission apparatus such as a motor or an engine or the like can be exemplified.

(10) A manufacturing method of a sliding member according to the present invention is characterized by including a sliding-member-forming-member preparing step for preparing a sliding-member forming member made of AlSi alloy containing 5 weight % to 40 weight % of Si, and an aluminum oxide film forming step for forming an aluminum oxide film on a sliding surface of the sliding-member forming member by anodizing the sliding surface of the sliding-member forming member in this order.

In this manner, according to the manufacturing method of a sliding member of the present invention, for a reason substantially equal to the reason explained in conjunction with the above-mentioned manufacturing method of a bearing according to the present invention, it is possible to manufacture the sliding member capable of maintaining the sliding performance over a long period.

Also the manufacturing method of a sliding member according to the present invention may preferably include advantageous technical features of the above-mentioned manufacturing method of a bearing according to the present invention.

That is, in the manufacturing method of a sliding member according to the present invention, the sliding-member-forming-member preparing step may preferably include an AlSi alloy fine powder manufacturing step for manufacturing AlSi alloy fine powder using an atomizing method and a sliding-member-forming-member manufacturing step for manufacturing the sliding-member forming member using the AlSi alloy fine powder in this order.

Further, in the manufacturing method of a sliding member according to the present invention, a thickness of the aluminum oxide film is preferably set to a value falling within a range from 0.3 mm to 10 μm, and it is more preferable to set the thickness of the aluminum oxide film to a value falling within a range from 0.5 μm to 3 μm.

In the manufacturing method of a sliding member according to the present invention, the manufacturing method may preferably further include a sizing step for decreasing a maximum crest height Rp of the sliding surface by performing sizing of the sliding surface between the sliding-member-forming-member preparing step and the aluminum oxide film forming step.

In the manufacturing method of a sliding member according to the present invention, the manufacturing method may preferably further include a lubrication film forming step for forming a lubrication film made of a fluoro-resin on a surface of the aluminum oxide film after performing the aluminum oxide film forming step.

In the manufacturing method of a sliding member according to the present invention, a dynamic pressure groove may preferably be formed in the sliding surface of the sliding-member forming member.

Here, "sliding member" includes, not to mention the bearing, a shaft which the bearing receives, a liner of an engine, other sliding members and the like.

BRIEF EXPLANATION OF THE DRAWINGS

FIG. 7 is a view for explaining the pressure sizing step S20;

FIG. 8 is a view for explaining an aluminum oxide film forming step S30;

FIG. 9 is a view for explaining a spindle motor 100 according to the embodiment 1;

FIG. 10 is a flowchart for explaining a manufacturing method of a bearing according to an embodiment 2;

FIG. 11 is a view for explaining a lubrication film forming step S240;

BEST MODE FOR CARRYING OUT THE INVENTION

Hereinafter, a manufacturing method of a bearing, a bearing unit and a rotary apparatus according to the present invention are explained in conjunction with embodiments shown in drawings.

Embodiment 1

Figure 1:
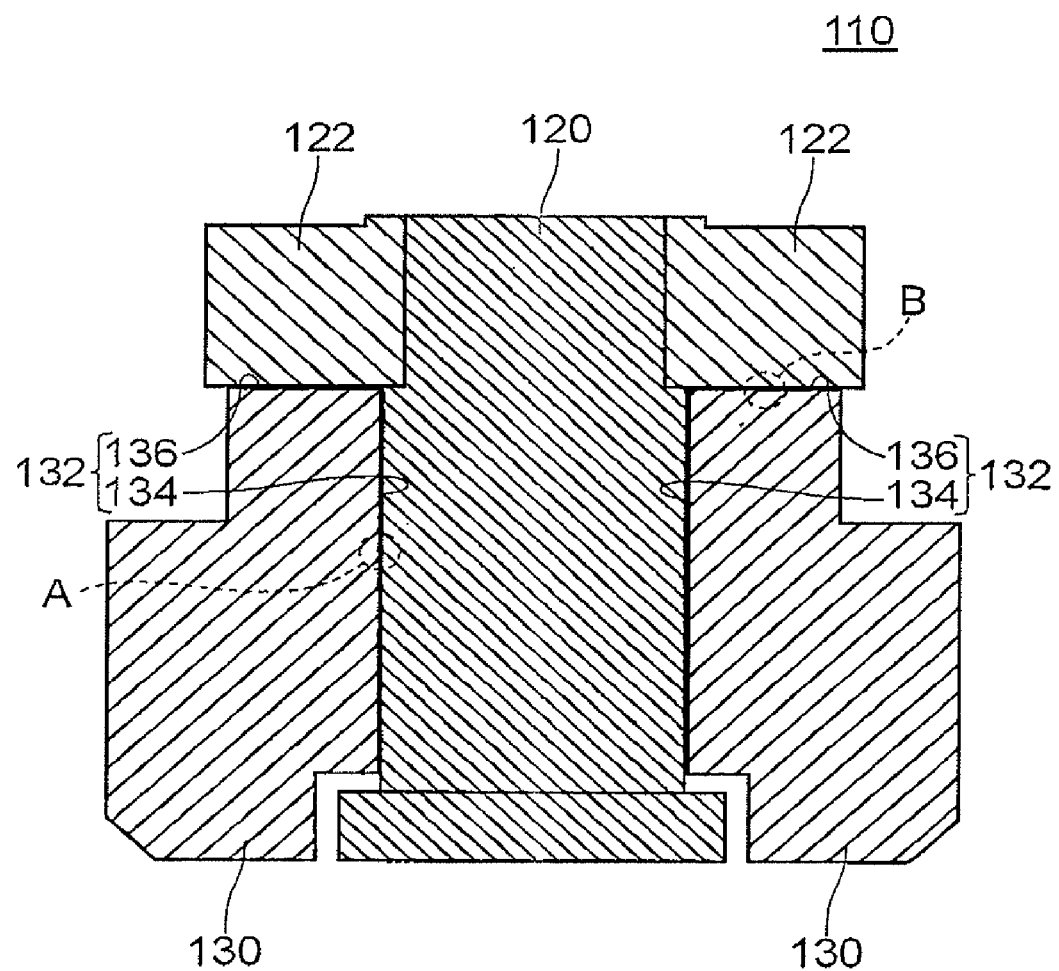
FIG. 1 is a cross-sectional view for explaining a bearing unit 110 according to an embodiment 1.
Figure 2A:
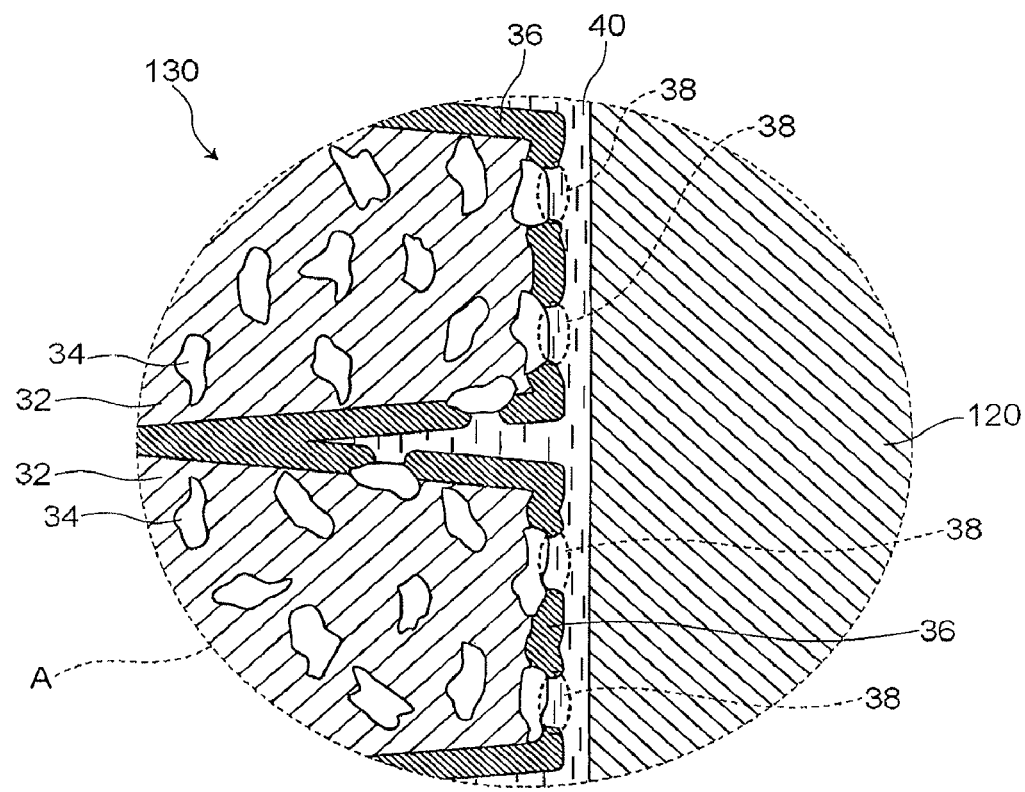
FIG. 2 is an enlarged cross-sectional view for explaining a surface state of a bearing surface 132.
Figure 2B:
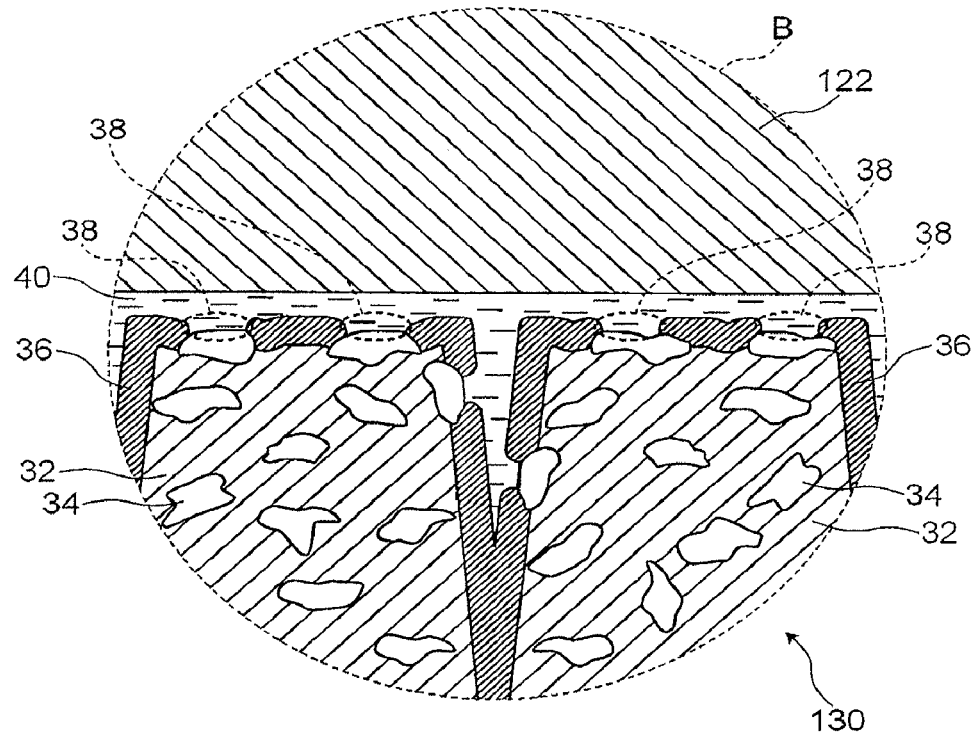

FIG. 1 is a cross-sectional view for explaining a bearing unit 110 according to an embodiment 1. FIG. 2 is an enlarged cross-sectional view for explaining a surface state of a bearing surface 132. FIG. 2(a) is an enlarged cross-sectional view of an area A in FIG. 1, and FIG. 2(b) is an enlarged cross-sectional view of an area B in FIG. 1. Here, in FIG. 1, an upper side of a surface of the paper corresponds to an upper side of the bearing unit 110 and a lower side of a surface of the paper corresponds to a lower side of the bearing unit 110.

The bearing unit 110 according to the embodiment 1 includes, as shown in FIG. 1, a bearing (or a bearing sleeve) 130 and a shaft 120 rotatably supported on a bearing surface 132 of the bearing 130.

The bearing 130 is made of AlSi alloy. The bearing 130 includes a radial bearing surface 134 and a thrust bearing surface 136 as the bearing surface 132.

The shaft 120 is made of stainless steel. The shaft 120 includes a thrust plate 122 positioned to face the thrust bearing surface 136 of the bearing 130 in an opposed manner. The shaft 120 is rotatably supported on the radial bearing surface 134 and the thrust bearing surface 136 of the bearing 130.

On the radial bearing surface 134 of the bearing 130, as shown in FIG. 2(a), an aluminum oxide film 36 having a large number of dimples 38 is formed. Also on the thrust bearing surface 136 of the bearing 130, as shown in FIG. 2(b), an aluminum oxide film 36 having a large number of dimples 38 is formed. Here, in FIG. 2(a) and FIG. 2(b), numeral 32 indicates an Al phase and numeral 34 indicates a Si phase.

In a gap defined between the radial bearing surface 134 of the bearing 130 and the shaft 120, a lubricant 40 is filled (see FIG. 2(a)). Also in a gap defined between the thrust bearing surface 136 of the bearing 130 and the thrust plate 122, a lubricant 40 is filled (see FIG. 2(b)).

In the manufacturing method of a bearing according to the embodiment 1, the bearing surface 132 is formed by cutting. Accordingly, the bearing surface 132 is formed by feeding a cutting tool at a predetermined pitch and hence, cutting marks appear on the bearing surface 132 at a predetermined pitch.

The bearing 130 of the bearing unit 110 can be manufactured by a manufacturing method of a bearing described hereinafter (the manufacturing method of a bearing according to the embodiment 1).

Figure 3:
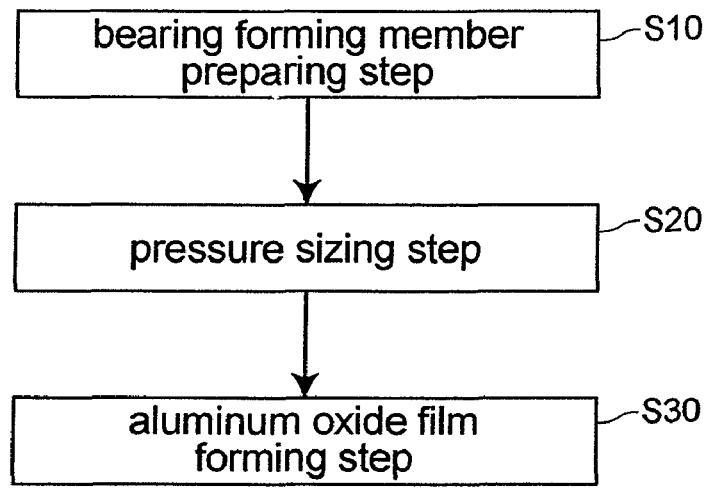
FIG. 3 is a flowchart for explaining a manufacturing method of a bearing according to the embodiment 1.
Figure 4:
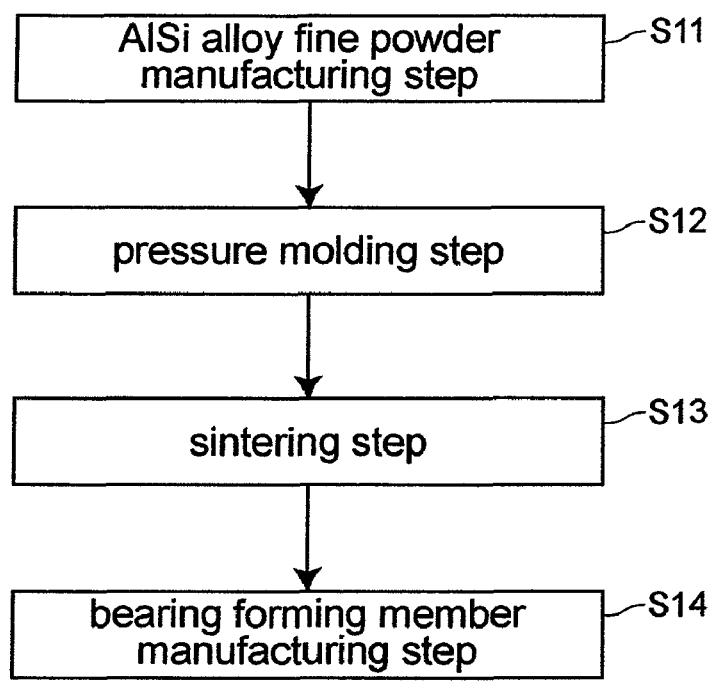
FIG. 4 is a flowchart for explaining a bearing forming member preparing step S10.

FIG. 3 is a flowchart for explaining a manufacturing method of the bearing according to the embodiment 1. FIG. 4 is a flowchart for explaining a bearing forming member preparing step S10. FIG. 5 is a view for explaining the bearing forming member preparing step S10. FIG. 5(a) to FIG. 5(e) are views showing respective steps in the bearing forming member preparing step S10.

Figure 6:
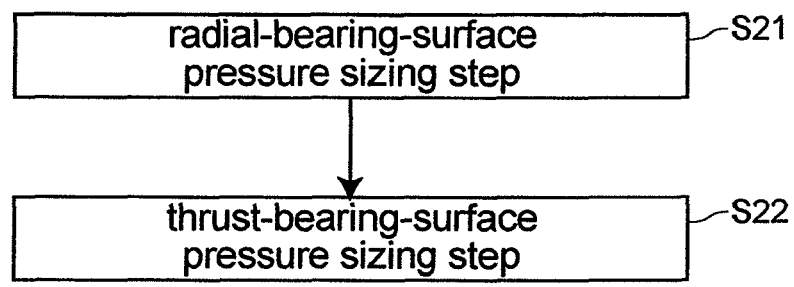
FIG. 6 is a flowchart for explaining a pressure sizing step S20.

FIG. 6 is a flowchart for explaining a pressure sizing step S20. FIG. 7 is a view for explaining the pressure sizing step S20. FIG. 7(a1) to FIG. 7(e1), FIG. 7(a2) to FIG. 7(e2) and FIG. 7(a3) to FIG. 7(e3) are views showing respective steps in the pressure sizing step S20. Here, FIG. 7(a2) to FIG. 7(e2) are enlarged cross-sectional views of an area A in FIG. 7(a1) to FIG. 7(e1), and FIG. 7(a3) to FIG. 7(e3) are enlarged cross-sectional views of an area B in FIG. 7(a1) to FIG. 7(e1).

FIG. 8 is a view for explaining an aluminum oxide film forming step S30. FIG. 8(a1) is a cross-sectional view of a bearing forming member W before performing the aluminum oxide film forming step S30, FIG. 8 (a2) is an enlarged cross-sectional view of an area A in FIG. 8 (a1), FIG. 8 (b1) is across-sectional view of the bearing 130 after performing the aluminum oxide film forming step S30, and FIG. 8(b2) is an enlarged cross-sectional view of an area A in FIG. 8(b1).

The manufacturing method of a bearing according to the embodiment 1 is, as shown in FIG. 3, a manufacturing method of a bearing which includes the bearing forming member preparing step S10, the pressure sizing step S20, and the aluminum oxide film forming step S30 in this order.

1. Bearing Forming Member Preparing Step S10

The bearing forming member preparing step S10 includes, as shown in FIG. 4, an AlSi alloy fine powder manufacturing step S11, a pressure molding step S12, a sintering step S13, and a bearing-forming-member manufacturing step S14 in this order.

(AlSi Alloy Fine Powder Manufacturing Step S11)

Figure 5A:
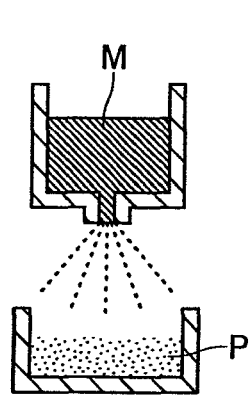
FIG. 5 is a view for explaining the bearing forming member preparing step S10.

Firstly, the AlSi alloy fine powder P containing 20 weight % of Si (average particle size: 10 μm) is manufactured using an atomizing method (see FIG. 5(a)).

(Pressure Molding Step S12)

Figure 5B:
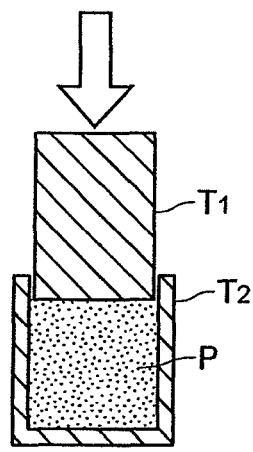
Figure 5C:
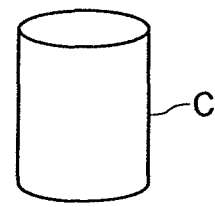

Next, the AlSi alloy fine powder P is molded under pressure using a mold T1 and a mold T2 (see FIG. 5(b)) thus manufacturing a compact C (see FIG. 5 (c)).

(Sintering Step S13)

Figure 5D:
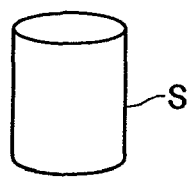

Next, the compact C is sintered in a vacuum thus manufacturing a sintered body S (see FIG. 5(d)).

(Bearing Forming Member Manufacturing Step S14)

Figure 5E:
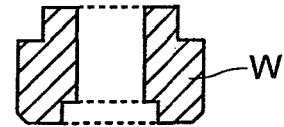

Next, the sintered body S is cut (cutting portions other than the bearing surface 132, cutting the radial bearing surface 134 and cutting the thrust bearing surface 136) thus manufacturing a bearing forming member W (see FIG. 5(e)).

2. Pressure Sizing Step S20

The pressure sizing step S20 which is performed as a sizing step includes, as shown in FIG. 6, a radial-bearing-surface pressure sizing step S21 and a thrust-bearing-surface pressure sizing step S22 in this order.

Before performing the pressure sizing step S20, both a radial bearing surface 134 and a thrust bearing surface 136 of the bearing forming member W assume surface states having a large maximum crest heights Rp (see FIG. 7(a2) and FIG. 7(a3)).

(Radial-Bearing-Surface Pressure Sizing Step S21)

Firstly, the pressure sizing is performed on the radial bearing surface 134 by press-fitting a columnar pressure sizing jig T3 into the radial bearing surface 134 of the bearing forming member W (see FIG. 7 (b1) and FIG. 7 (b2)). After performing the radial bearing surface pressure sizing step S21, the maximum crest height Rp of the radial bearing surface 134 is decreased (see FIG. 7(c2)).

(Thrust-Bearing-Surface Pressure Sizing Step S22)

Next, the pressure sizing is performed on the thrust bearing surface 136 by pressing a cylindrical pressure sizing jig T4 to the thrust bearing surface 136 of the bearing forming member W (see FIG. 7(d1) and FIG. 7 (d3)). After performing the thrust bearing surface pressure sizing step S22, the maximum crest height Rp of the thrust bearing surface 136 is also decreased (see FIG. 7(e3)).

3. Aluminum Oxide Film Forming Step S30

The aluminum oxide film forming step S30 is a step whereby anodizing the bearing forming member W (see FIG. 8(a1) and FIG. 8(a2)) after performing the pressure sizing step S20, the aluminum oxide film 36 is formed on the bearing surface 132 (see FIG. 8(b1) and FIG. 8(b2)). This step is performed by applying an electrolysis to the bearing forming member W in a state that the bearing forming member W is immersed in an electrolytic solution (for example, sulfuric acid) using the bearing forming member W as an anode. A thickness of the formed aluminum oxide film 36 is 1 μm.

The AlSi alloy which forms the bearing forming member W possesses the microstructure where an Si phase 34 having an average particle size of 10 μm is distributed in an Al phase 32 in an island pattern (see FIG. 8(a2)). When the aluminum oxide film forming step S30 is performed, portions of the AlSi alloy where the Al phase 32 is exposed are formed in a raised state due to the formation of the aluminum oxide film 36, and the aluminum oxide film 36 is not formed on the portions of the AlSi alloy where the Si phase 34 is exposed thus forming a large number of dimples 38 thereon (see FIG. 8(b2)). That is, on the bearing surface 132 of the bearing 130, the aluminum oxide film 36 having a large number of dimples 38 is formed.

By performing the above-mentioned steps, the bearing 130 according to the embodiment 1 can be manufactured. Further, by inserting the shaft 120 into the bearing 130 manufactured by the manufacturing method of a bearing according to the embodiment 1, it is possible to manufacture the bearing unit 110 having the structure where the shaft 120 is rotatably supported on the radial bearing surface 134 in the radial direction and on the thrust bearing surface 136 in the thrust direction.

According to the manufacturing method of a bearing of the embodiment 1 explained above, the aluminum oxide film 36 having a large number of fine dimples 38 is formed on the bearing surface 132 (the radial bearing surface 134, the thrust bearing surface 136) of the bearing 130 and hence, it is possible to easily retain the lubricant 40 in the dimples 38 due to a capillary phenomenon. As a result, according to the manufacturing method of a bearing of the embodiment 1, it is possible to manufacture the bearing 130 which can maintain the bearing performance over a long period.

Further, according to the manufacturing method of a bearing of the embodiment 1, due to the presence of the aluminum oxide film 36 having the high insulation property on the bearing surface 132 (the radial bearing surface 134, the thrust bearing surface 136) of the bearing 130 and hence, the corrosion of the bearing 130 and the shaft 120 can be suppressed whereby it is also possible to manufacture the bearing 130 which can maintain the bearing performance over a long period.

Further, according to the manufacturing method of a bearing of the embodiment 1, due to the presence of the aluminum oxide film 36 having high hardness on the bearing surface 132 (the radial bearing surface 134, the thrust bearing surface 136) of the bearing 130, the wear resistance of the bearing surface 132 (the radial bearing surface 134, the thrust bearing surface 136) of the bearing 130 can be increased and hence, it is also possible to manufacture the bearing 130 which can maintain the bearing performance over a long period.

Still further, according to the manufacturing method of a bearing of the embodiment 1, the aluminum oxide film 36 is formed in a finely dispersed manner on the bearing surface 132 and hence, cracks hardly occur in the aluminum oxide film 36 even under the high-load rotation whereby it is also possible to manufacture the bearing 130 which can maintain the bearing performance over a long period.

Still further, according to the manufacturing method of a bearing of the embodiment 1, the AlSi alloy fine powder manufacturing step S11 is performed using an atomizing method for manufacturing metal fine powder by spraying molten metal M and hence, it is possible to manufacture the bearing forming member W which possesses the microstructure where the fine Si phases 34 are uniformly dispersed in the Al phase 32.

Still further, according to the manufacturing method of a bearing of the embodiment 1, the sintering step S13 is performed in a vacuum and hence, it is possible to suppress the lowering of quality of the bearing 130 attributed to the presence of an active gas such as oxygen. Further, it is possible to manufacture the dense bearing 130 having high density.

Still further, according to the manufacturing method of a bearing of the embodiment 1, a thickness of the aluminum oxide film 36 is set to the value falling within a range from 0.3 μm to 10 μm and hence, it is possible to suppress the corrosion of the bearing 130 and the shaft 120 while ensuring the insulation property of the aluminum oxide film 36 whereby the surface roughness of the bearing surface 132 (the radial bearing surface 134, the thrust bearing surface 136) can be decreased thus suppressing the lowering of the bearing performance of the bearing 130.

Still further, according to the manufacturing method of a bearing of the embodiment 1, a maximum crest height Rp of projecting portions present on the bearing surface 132 (the radial bearing surface 134, the thrust bearing surface 136) can be decreased in the pressure sizing step S20 and hence, the occurrence of damages on the surface of the shaft 120 can be suppressed whereby it is possible to manufacture the bearing 130 which can maintain the bearing performance for a longer period.

On the other hand, the bearing unit 110 according to the embodiment 1 includes the bearing 130 capable of maintaining the bearing performance over a long period as described above and hence, it is possible to provide the bearing unit which can maintain the bearing performance over a long period.

Still further, according to the bearing unit 110 of the embodiment 1, it is possible to provide the bearing unit which can rotatably support the shaft 120 on the radial bearing surface 134 in the radial direction and on the thrust bearing surface 136 in the thrust direction.

FIG. 9 is a view for explaining a spindle motor 100 according to the embodiment 1. Here, in FIG. 9, parts identical with the parts explained in conjunction with FIG. 1 are given same numerals and their detailed explanation is omitted. Here, in FIG. 9, an upper side of a surface of the paper corresponds to an upper side of the spindle motor 100, and a lower side of a surface of the paper corresponds to a lower side of the spindle motor 100.

The spindle motor 100 according to the embodiment 1 corresponds to a rotary apparatus of the present invention, and includes, as shown in FIG. 9, a rotor 140 which mounts a rotor magnet 142 thereon, a stator 150 which mounts a stator coil 152 thereon, and the bearing unit 110 which is fixed to the stator 150 and rotatably supports the rotor 140.

In the spindle motor 100 of the embodiment 1, the center of magnetism of the stator coil 152 is offset downwardly from the center of magnetism of the rotor magnet 142. Accordingly, a downward force is applied to the rotor 140 (and the thrust plate 122) thus giving rise to a state where a thrust load is applied to the thrust bearing surface 136 of the bearing 130.

In this manner, the spindle motor 100 of the embodiment 1 includes, as described above, the bearing unit 110 capable of maintaining the bearing performance over a long period and hence, it is possible to provide a spindle motor capable of maintaining high reliability over a long period.

Embodiment 2

FIG. 10 is a flowchart for explaining a manufacturing method of a bearing according to an embodiment 2. FIG. 11 is a view for explaining a lubrication film forming step S240. FIG. 11(a1) is a cross-sectional view of a bearing forming member W before performing the lubrication film forming step S240, FIG. 11(a2) is an enlarged cross-sectional view of an area A in FIG. 11(a1), FIG. 11(b1) is a cross-sectional view of the bearing forming member W after performing the lubrication film forming step S240, and FIG. 11(b2) is an enlarged cross-sectional view of an area A in FIG. 11(b1). Here, in FIG. 11, parts identical with the parts explained in the embodiment 1 are given same numerals and their detailed explanation is omitted.

The manufacturing method of the bearing according to the embodiment 2 basically includes steps substantially equal to the steps of the manufacturing method of a bearing according to the embodiment 1. However, the manufacturing method of a bearing according to the embodiment 2 differs from the manufacturing method of the bearing according to the embodiment 1 with respect to a point that the manufacturing method of a bearing according to the embodiment 2 further includes a lubrication film forming step. That is, the manufacturing method of a bearing according to the embodiment 2 further includes, as shown in FIG. 10, the lubrication film forming step S240 after an aluminum oxide film forming step S230.

The lubrication film forming step S240 is a step where a lubrication film 52 made of a fluoro-resin is formed on a surface of the bearing forming member W (see FIG. 11(a1) and FIG. 11(a2)) after performing the aluminum oxide film forming step S230 (see FIG. 11(b1) and FIG. 11(b2)). As a method for forming the lubrication film 52 made of the fluoro-resin, for example, a method which immerses a bearing forming member in a solution produced by dispersing a fluoro-resin in an organic solvent can be used.

Before performing the lubrication film forming step S240, the aluminum oxide film 36 having a large number of fine dimples 38 is formed on a radial bearing surface 234 (see FIG. 11(b1)). Accordingly, when the lubrication film forming step S240 is performed, there arises a state where the lubrication film 52 is formed on a surface of the aluminum oxide film 36, while the lubrication film 52 is not formed on portions of the radial bearing surface 234 corresponding to the dimples 38 (see FIG. 11(b2)).

As a result, according to a manufacturing method of a bearing of the embodiment 2, the lubrication film 52 made of a fluoro-resin having the excellent lubrication property is present on an outermost surface of the radial bearing surface 234 and an outermost surface of the thrust bearing surface 236 and hence, the lubrication property between the radial bearing surface 234 and the shaft and the lubrication property between the thrust bearing surface 236 and the shaft in the bearing 230 can be increased thus further enhancing the bearing performance of the bearing 230.

The manufacturing method of a bearing according to the embodiment 2 includes substantially the same steps as the manufacturing method of the bearing according to the embodiment 1 with respect to points except for the point that the manufacturing method of a bearing according to the embodiment 2 further includes the lubrication film forming step and hence, the manufacturing method of a bearing according to the embodiment 2 also acquires the corresponding advantageous effects out of the advantageous effects that the manufacturing method of the bearing according to the embodiment 1 acquires.

Embodiment 3

An embodiment 3 is an embodiment explained with respect to a case where the bearing unit of the present invention is applied to a pivot bearing of a hard disc device.

Figure 12:
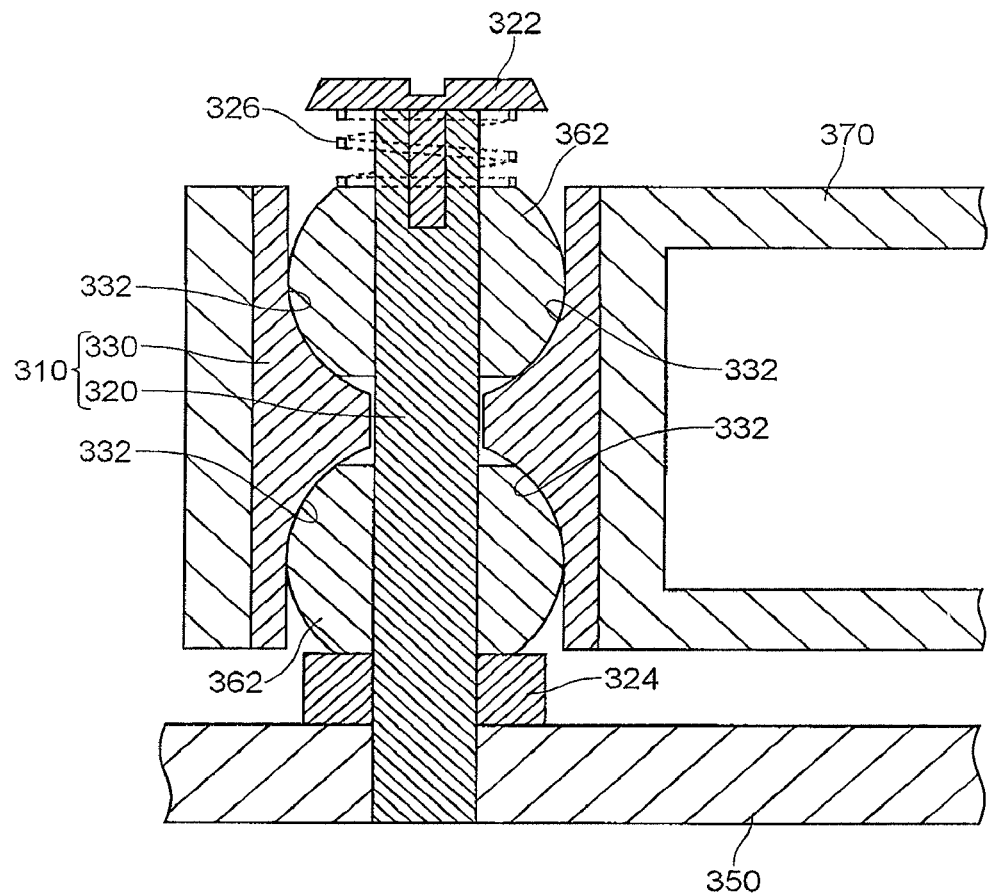
FIG. 12 is a cross-sectional view for explaining a bearing unit 310 according to an embodiment 3.

FIG. 12 is a cross-sectional view for explaining a bearing unit 310 according to the embodiment 3. Here, in FIG. 12, an upper side of a surface of the paper corresponds to an upper side of the bearing unit 310 and a lower side of a surface of the paper corresponds to a lower side of the bearing unit 310.

The bearing unit 310 according to the embodiment 3 includes, as shown in FIG. 12, a bearing 330 and a shaft 320 rotatably supported on a bearing surface 332 of the bearing 330 by way of spherical slide bodies 362.

The bearing 330 includes bearing surfaces 332 having a shape corresponding to a shape of the spherical slide bodies 362 (described later). An aluminum oxide film 36 (not shown in the drawing) having a large number of dimples 38 (not shown in the drawing) is formed on the bearing surfaces 332 of the bearing 330. The bearing 330 can be manufactured using a manufacturing method substantially equal to the manufacturing method of a bearing according to the embodiment 1. The shaft 320 is made of stainless steel. The shaft 320 is configured to be integrally rotated with a pair of spherical slide bodies 362 which is pressurized in the directions that the pair of spherical slide bodies 362 approaches to each other due to a spring 326. Further, the shaft 320 is fixed to a base 350 by way of a spacer 324. A carriage arm 370 is mounted on an outer periphery of the bearing 330.

According to the bearing unit 310 of the embodiment 3 explained above, the bearing unit 310 includes the bearing 330 capable of maintaining the bearing performance over a long period and hence, it is possible to provide a bearing unit capable of maintaining the bearing performance over a long period.

Further, according to the bearing unit 310 of the embodiment 3, the bearing 330 and the shaft 320 are held by the spherical slide bodies 362 which are pressurized in the directions that the spherical slide bodies 362 approach each other and hence, it is possible to provide a bearing unit where the shaft 320 is rotatably supported on the bearing surface 332 with a small backlash.

Embodiment 4

Figure 13:
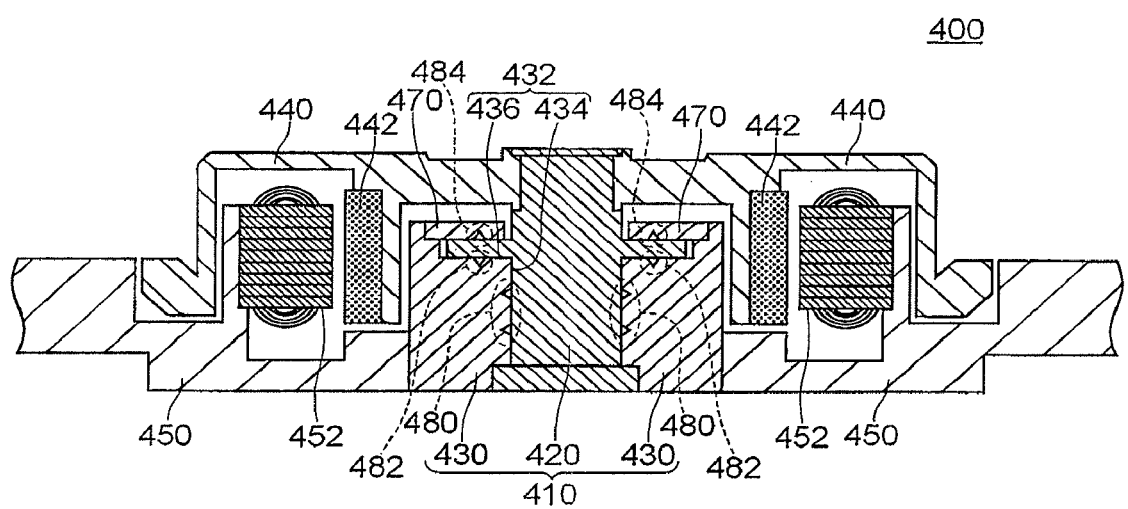
FIG. 13 is a view for explaining a bearing 430 according to an embodiment 4.

FIG. 13 is a view for explaining a bearing 430 according to an embodiment 4.

The bearing 430 according to the embodiment 4 is used as a bearing of a spindle motor 400 including a rotor 440 on which a rotor magnet 442 is mounted, a stator 450 on which a stator coil 452 is mounted, and a bearing unit 410 which is fixed to the stator 450 and rotatably supports the rotor 440. Although the bearing 430 according to the embodiment 4 basically has the substantially equal constitution as the bearing 130 according to the embodiment 1, the bearing 430 according to the embodiment 4 differs from the bearing 130 according to the embodiment 1 with respect to the point that the dynamic pressure groove is formed in a bearing surface. That is, the bearing 430 according to the embodiment 4 differs from the bearing 130 according to the embodiment 1 with respect to a point that, as shown in FIG. 13, the dynamic pressure grooves 480, 482 are formed respectively on a bearing surface 432 (a radial bearing surface 434 and a thrust bearing surface 436).

In this manner, in the bearing 430 according to the embodiment 4, the dynamic pressure grooves 480, 482 are formed in the bearing surface 432 and hence, a dynamic pressure is generated between the bearing 430 and a shaft 420 to bring the bearing 430 and the shaft 420 into a non-contact state whereby the bearing performance of the bearing 430 can be further increased.

Here, even such dynamic pressure grooves 480, 482 are formed in the bearing surface 432, when the strong vibrations are applied to the bearing 430 and the shaft 420, there may be a case that the bearing 430 and the shaft 420 are brought into contact with each other. However, even in such a case, in the same manner as the bearing 110 according to the embodiment 1, the bearing 430 according to the embodiment 4 is a bearing which forms an aluminum oxide film 36 (not shown in the drawing) on the bearing surface 432 by anodizing a bearing surface of a bearing forming member made of AlSi alloy and hence, the bearing 430 can maintain the bearing performance over a long period.

In this manner, the spindle motor 400 includes the bearing 430 capable of maintaining the bearing performance over a long period as described above and hence, it is possible to provide a spindle motor which can maintain high reliability over a long period.

The bearing 430 according to the embodiment 4 has substantially the same constitution as the bearing 130 according to the embodiment 1 with respect to points except for the point that the dynamic pressure grooves are formed in the bearing surface and hence, the bearing 430 according to the embodiment 4 can also acquire the corresponding advantageous effects out of the advantageous effects that the bearing 130 according to the embodiment 1 acquires.

Although the manufacturing method of a bearing, the bearing unit and the rotary apparatus of the present invention have been explained heretofore in conjunction with the above-mentioned respective embodiments, the present invention is not limited to these embodiments, and the present invention can be exercised without departing from the gist of the present invention. For example, the following modifications are conceivable.

(a) In the manufacturing method of a bearing according to the embodiment 1, although the bearing forming member W is manufactured by cutting the sintered body S, the present invention is not limited to such a manufacturing method. For example, the bearing forming member may be manufactured from the sintered body S by injection molding, or the bearing forming member may be manufactured by forging the sintered body S.

(b) In the manufacturing method of a bearing according to the embodiment 1, the pressure sizing is applied to the bearing surface 132 (the radial bearing surface 134, the thrust bearing surface 136) using the pressure sizing jigs T3, T4. In the present invention, the pressure sizing may be performed while imparting ultrasonic vibrations to the bearing surface 132 or the pressure sizing may be performed while rotating the pressure sizing jigs.

(c) In the manufacturing method of a bearing according to the embodiment 1, although the thrust-bearing-surface pressure sizing step S22 is performed, the present invention is not limited to such a manufacturing method. For example, the thrust-bearing-surface pressure sizing step may be omitted.

(d) In the manufacturing method of a bearing according to the embodiment 1, although the pressure sizing step is performed as the sizing step, the present invention is not limited to such a manufacturing method. For example, a chemical sizing step may be performed as the sizing step.

(e) In the manufacturing method of a bearing according to the embodiment 1, although the aluminum oxide film forming step is performed after performing the pressure sizing step, the present invention is not limited to such a manufacturing method. For example, the pressure sizing step may be performed after performing the aluminum oxide film forming step.

(f) In the manufacturing method of a bearing according to the embodiment 1, the bearing is manufactured using the sintered body S acquired by molding the AlSi alloy fine powder P under pressure and, thereafter, by sintering the molded compact in a vacuum. However, the present invention is not limited to such a manufacturing method. For example, the bearing may be manufactured using a molded body acquired by molding the AlSi alloy fine powder P under pressure and, thereafter, by extruding the molded compact.

Figure 14:
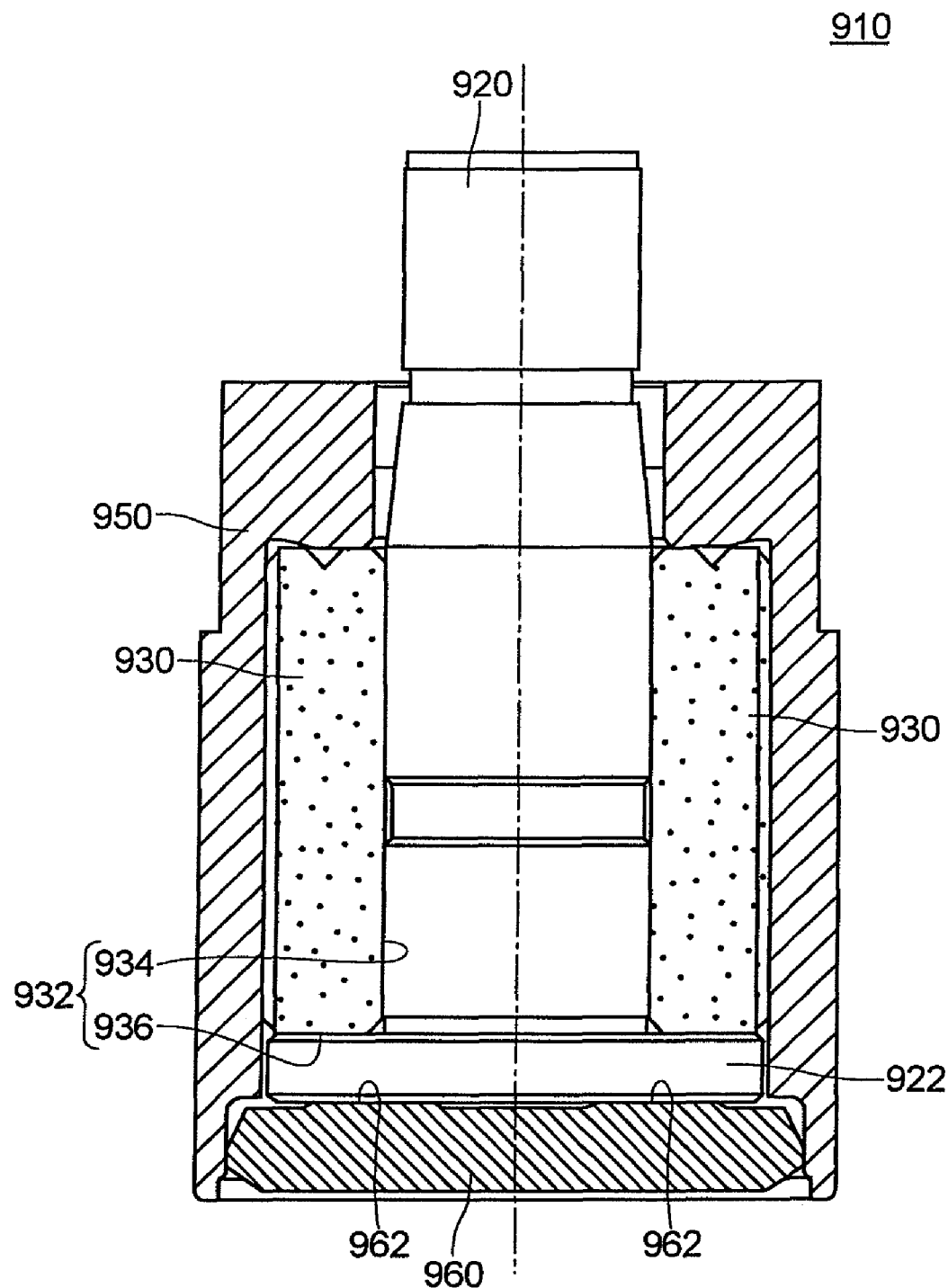
FIG. 14 is a view for explaining a conventional bearing unit 910.

(g) In the manufacturing method of a bearing according to the embodiment 1, the bearing 130 which includes the radial bearing surface 134 and the thrust bearing surface 136 as the bearing surface is exemplified. However, the present invention is not limited to such a manufacturing method. For example, the present invention may be applied to the bearing 960 in the conventional bearing unit 910 shown in FIG. 14 (bearing 960 having a flat shape which includes only the thrust bearing surface 962).

(h) In the embodiments 1 to 4, the present invention has been explained by taking the bearing as an example. However, the present invention is not limited to such an example. For example, the manufacturing method of a sliding member of the present invention may be applicable to a manufacturing method of a shaft which a bearing receives. In this case, the shaft is formed using AlSi alloy, an aluminum oxide film is formed on a slide surface of the shaft (also including a slide surface of a thrust plate when the shaft includes the thrust plate) by anodizing the slide surface. In this case, the shaft corresponds to the sliding member of the present invention. Further, the manufacturing method of a sliding member of the present invention is also applicable to a manufacturing method of a liner of an engine. In this case, the liner of the engine can be manufactured by forming the liner of the engine using AlSi alloy and by forming an aluminum oxide film on an inner surface of the liner of the engine (sliding surface with a piston ring) by anodizing the sliding surface. In this case, the liner of the engine corresponds to the sliding member of the present invention.

EXPLANATION OF SYMBOLS

32: Al phase, 34: Si phase, 36: aluminum oxide film, 38: dimple, 40: lubricant, 52: lubrication film, 100, 400: spindle motor, 110, 310, 410, 910: bearing unit, 120, 320, 420, 920: shaft, 122, 922: thrust plate, 130, 230, 330, 430, 470, 930: bearing, 132, 332, 432, 962: bearing surface, 134, 234, 434, 934: radial bearing surface, 136, 236, 436, 936: thrust bearing surface, 140, 440: rotor, 142, 442: rotor magnet, 150, 450: stator, 152, 452: stator coil, 324: spacer, 326: spring, 350: base, 362: spherical slide body, 370: carriage arm, 480, 482,

484: dynamic pressure grooves, 950: casing, C: compact, M: molten metal, P: AlSi alloy fine powder, S: sintered body, T1, T2: mold, T3, T4: pressure sizing jig, W: bearing forming member

The invention claimed is:

1. A manufacturing method, comprising:

pressing a bearing surface of a bearing member to decrease a surface roughness thereof by plastically deforming projecting portions formed on the bearing surface, the bearing member made of AlSi alloy containing 5 weight % to 40 weight % of Si; and after said pressing, anodizing the bearing surface of the bearing member to form an aluminum oxide film on the bearing surface;

wherein said AlSi alloy is manufactured by using an AlSi alloy fine powder by an atomizing method and has a microstructure where a Si phase is distributed in an Al phase and in an island pattern, wherein portions of the bearing surface, where the Al phase is exposed, are formed in a raised state due to the formation of the aluminum oxide film, and wherein portions of the bearing surface, where the Si phase is exposed and the aluminum oxide film is not formed, are formed in a dimple state by said anodizing.

2. The method of claim 1, wherein the aluminum oxide film is formed to a thickness within a range from 0.3 mm to 10 mm.

3. The method of claim 1, further comprising:

after said anodizing, forming a lubrication film made of a fluoro-resin on a surface of the aluminum oxide film.

4. The method of claim 1, wherein a dynamic pressure groove is formed in the bearing surface of the bearing member.

5. A manufacturing method, comprising:

pressing a sliding surface of a sliding-member to decrease a surface roughness thereof by plastically deforming projecting portions formed on the sliding surface, the sliding-member made of AlSi alloy containing 5 weight % to 40 weight % of Si; and after said pressing, anodizing the sliding surface of the sliding-member to form an aluminum oxide film on the sliding surface;

wherein said AlSi alloy is manufactured by using an AlSi alloy fine powder by an atomizing method and has a microstructure where a Si phase is distributed in an Al phase and in an island pattern, wherein portions of the sliding surface, where the Al phase is exposed, are formed in a raised state due to the formation of the aluminum oxide film, and wherein portions of the sliding surface, where the Si phase is exposed and the aluminum oxide film is not formed, are formed in a dimple state by said anodizing.

6. A manufacturing method, comprising:

anodizing a bearing surface of a bearing member to form an aluminum oxide film on the bearing surface, the bearing member made of AlSi alloy containing 5 weight % to 40 weight % of Si; and after said anodizing, pressing the bearing surface to decrease a surface roughness thereof by plastically deforming projecting portions formed on the bearing surface;

wherein said AlSi alloy is manufactured by using an AlSi alloy fine powder by an atomizing method and has a microstructure where a Si phase is distributed in an Al phase and in an island pattern, wherein portions of the bearing surface, where the Al phase is exposed, are formed in a raised state due to the formation of the aluminum oxide film, and wherein portions of the bearing surface, where the Si phase is exposed and the aluminum oxide film is not formed, are formed in a dimple state by said anodizing.

7. A manufacturing method, comprising:

anodizing a sliding surface of a sliding-member to form an aluminum oxide film on the sliding surface, the sliding-member made of AlSi alloy containing 5 weight % to 40 weight % of Si; and after said anodizing, pressing the sliding surface of the sliding-member to decrease a surface roughness thereof by plastically deforming projecting portions formed on the sliding surface;

wherein said AlSi alloy is manufactured by using an AlSi alloy fine powder by an atomizing method and has a microstructure where a Si phase is distributed in an Al phase and in an island pattern, wherein portions of the sliding surface, where the Al phase is exposed, are formed in a raised state due to the formation of the aluminum oxide film, and wherein portions of the sliding surface, where the Si phase is exposed and the aluminum oxide film is not formed, are formed in a dimple state by said anodizing.

* * * * *